United States Patent

[11] 3,552,245

[72] Inventor Burl D. Dickerson
 14355 Elm, San Leandro, Calif. 94579
[21] Appl. No. 739,792
[22] Filed June 25, 1968
[45] Patented Jan. 5, 1971

[54] PANEL TEMPLATE MAKER
 1 Claim, 5 Drawing Figs.
[52] U.S. Cl.................................................. 83/11,
 30/358; 83/691, 83/700; 174/48; 220/3.4
[51] Int. Cl.................................................... B26d 3/08,
 B26d 7/26
[50] Field of Search.......................................... 83/566,
 569, 570, 679, 684, 691H, 697, 701, 700, 6, 11;
 30/361, 358; 279/83; 174/48; 220/3.4

[56] References Cited
 UNITED STATES PATENTS

| 676,782 | /1901 | Stimpson.................... | 83/691 |
| 1,761,207 | /1930 | Guertin...................... | 30/358 |
| 2,087,186 | /1937 | Freeman, Jr................ | 83/684X |
| 3,251,130 | /1966 | Miles.......................... | 220/3.4X |

Primary Examiner—Andrew R. Juhasz
Assistant Examiner—James F. Coan
Attorney—Robert K. Rhea ABSTRACT: A sleeve sized for cooperatively surrounding the free end of a conduit is adjustably secured thereto by a setscrew. A tubular template cutter, having a sharpened end, is coaxially received by the free end of the sleeve and is rigidly secured therein by a bolt so that when template forming material is forced against the cutter the cutter forms a hole in the template material coaxial with respect to the conduit.

PATENTED JAN 5 1971

3,552,245

BURL D. DICKERSON
*INVENTOR.*

BY
Robert K. Rhea
AGENT 3,552,245

PANEL TEMPLATE MAKER

BACKGROUND OF THE INVENTION

The present invention relates to electrical wiring and more particularly to a means for registering the position of conduits on a template to be used when drilling a panel.

Electrical wiring is conventionally placed within metal pipes or conduits and when these conduits are extended toward a termination point for connection with a power panel, or the like, it is necessary that holes or apertures be formed in the panel for the entry of the respective conduits. Electrical conduit runs, comprising a plurality of conduits of required size, are conventionally arranged in juxtaposed spaced relation and considerable valuable time is usually required for measuring or calculating the space between the centers of the conduit ends adjacent an electrical panel. Holes or openings are formed in the panel for the entry of the conduits and it is necessary that these holes be coaxially located for each conduit.

This invention eliminates the time usually required for locating the centers of the holes to be drilled in a panel for the entry of a plurality of conduits by forming a template scribing or cutting member, one for each individual conduit. A template may be then superposed on the cutter ends and forced against the latter which forms a template which is, in turn, used for locating apertures in an electrical panel.

SUMMARY OF THE INVENTION

A sleeve slidably surrounds and extends beyond the free end portion of a conduit and is secured thereto by a setscrew. A tube, having an inwardly beveled sharpened end, has its other end portion coaxially received by and secured within the free end of the sleeve by a bolt.

The invention is preferably made up in kit form comprising a plurality of sleeves and cutters in a selected range of sizes corresponding to the size of conduit most frequently used. One of the sleeves and its cutter tube is placed upon the respective conduit of an electrical run all terminating in approximately the same elevation or plane. The sleeves are then adjustably secured to the respective conduit by the set screws so that the free sharpened end edge of the respective cutter lies in a common plane. A template of relatively soft material, preferably having a wooden backing, is placed over the sharpened ends of the cutters and forced against the cutters, as by hammering the backup board, so that each cutter marks or forms a hole in the template material. This marked or perforated template is then used as a guide to form conduit openings in a panel wall to be joined with the conduits.

The principal object is to provide cutter means for forming a template and locating electrical panel conduit hole entry positions.

DESCRIPTION OF THE PREFERRED EMBODIMENTS

Figure 1:
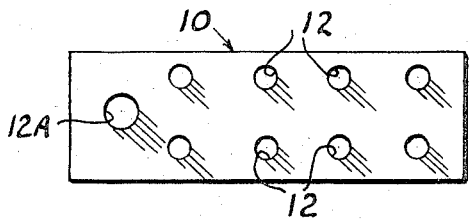
FIG. 1 is a plan view of a template or hole forming guide for conduit entry.

Like characters of reference designate like parts in those figures of the drawings in which they occur.

In the drawings:

The reference numeral 10 illustrates a template formed of sheet material of a size which coincides with or approximates the size of a panel surface to be drilled or punched for the reception of a plurality of electrical conduits. The holes or apertures 12, formed in the template, are spaced in accordance with the position of the conduits as hereinafter described.

The numeral 14 indicates a plurality of approximately the same diameter conduits 14 illustrated as rising through a floor, wall 16, or the like, wherein the upper ends of the conduits terminate in approximately the same horizontal plane. Other sizes of conduits, such as the conduit 18, may occupy space adjacent the conduits 14. By way of example, the conduits 14 and 18 are shown vertically disposed but may be horizontal. The spacing between the respective conduits is not critical as long as they are spaced apart a sufficient distance for entering holes or apertures to be formed in a panel wall or junction box, neither of which are shown.

Figures 3, 4:
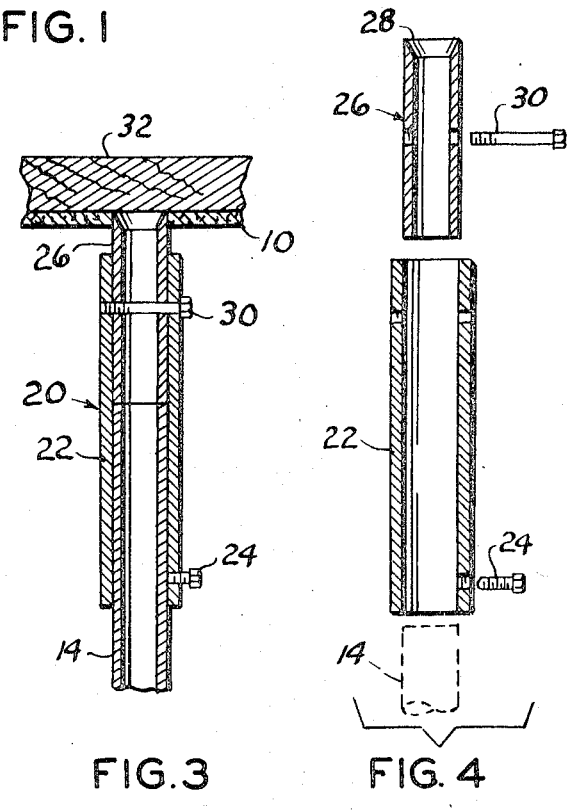
FIG. 3 is a fragmentary vertical cross-sectional view, to a larger scale, taken substantially along the line 3—3 of FIG. 2.
FIG. 4 is a longitudinal sectional view illustrating the components of the template maker, per se, in exploded relation with respect to each other and, showing by dotted lines, its relation with respect to a fragmentary end of a conduit.

A template cutter, indicated generally at 20, is placed on each of the conduits 14. The template cutter 20 comprises a sleeve 22 having a bore slidably received by the free end of the respective conduit 14. Adjacent its downwardly disposed end, as viewed in FIG. 3, the wall of the sleeve is drilled and threaded for receiving a setscrew 24 for securing the sleeve to the conduit. The other end portion of the sleeve coaxially receives a cutter tube 26 which projects outwardly beyond the free end of the sleeve. The outwardly projecting end edge of the tube 26 is internally beveled to form a cutting edge or end surface 28 diametrically equal with the diameter of the tube 26. Diametrically the tube 26 is preferably slightly greater than the outside diameter of the conduit 14 for the purposes readily apparent.

The tube 26 and sleeve 22 are diametrically line drilled and threaded for receiving a bolt 30 for fixing the position of the tube with respect to the sleeve.

The reference numeral 20A indicates an identically formed template cutter sized for the larger diameter conduit 18.

Figure 2:
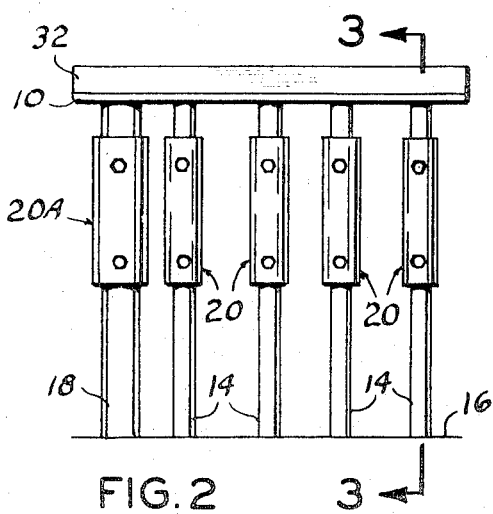
FIG. 2 is a side elevational view illustrating the manner of making the template of FIG. 1.

As shown in FIG. 2, the sleeves of the respective cutters 20 and 20A are positioned vertically over the free ends of the conduits 14 and 18, respectively, so that the cutting end edge 28 of the cutting tubes 26 lie in a common plane. The material forming the template 10 is preferably secured to a rectangular section of wood 32, or the like, as by taping or tacking. The template is then placed in overlying relation with respect to the cutting tubes 26 with one edge of the wooden block 32 positioned against the wall or other reference surface, now shown. The template 10 is then forced against the cutting end edges 28, as by hammering on the surface of the block 32 opposite the template 10. This scores or cuts the position of the respective cutting tube in the material of the template which will form the holes 12 and 12A (FIG. 1). The template 10 is then removed from the block 32 and the same edge of the template used as a reference location is placed along one edge or side surface of the panel or junction box, neither being shown, which locates the position of the holes necessary for the conduits 14 and 18. Thereafter the panel wall may be apertured in any conventional manner thus forming openings for the cooperative reception of the conduits 14 and 18.

Figure 5:
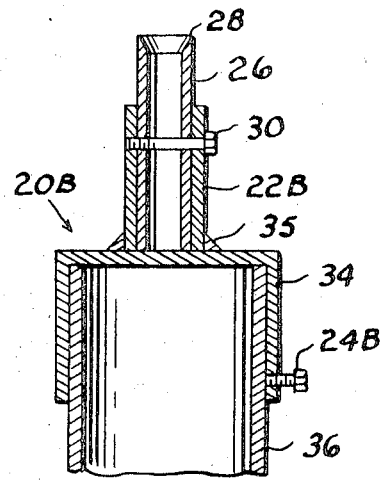
FIG. 5 is a vertical cross-sectional view illustrating an alternative manner of forming a template cutter.

Referring more particularly to FIG. 5, an alternative embodiment of the cutter is indicated by the numeral 20B and comprises a sleeve 22B coaxially secured, as by welding 35, to a socket member 34. The socket 34 is sized for larger size conduits, for example 4½inch diameter and is similarly provided with a setscrew 24B for adjusting the socket 34 relative to the free end of the conduit 36. One of the cutter tubes 26 is similarly secured within the sleeve 22B by the bolt 30. In this example the cutter tube 26 locates only the central portion of the hole to be formed for the conduit 36.

Obviously the invention is susceptible to some change or alteration without defeating its practicability, and I therefore do not wish to be confined to the preferred embodiment shown in the drawings and described herein.

I claim:

1. In combination with a plurality of electrical conduit end portions and a section of template forming material, the improvement comprising: cutter means supported by each said conduit for scoring said template forming material when forced against said cutter means, said cutter means comprising a cutter tube having a sharpened end surface; cutter tube adjusting means comprising a sleeve secured to each said cutter tube and extending between and coaxially surrounding the respective adjacent end portions of each said conduit and each said cutter tube, respectively; and, a setscrew extending through the wall of each said sleeve for longitudinally adjusting the position of each said sleeve relative to its supporting conduit and disposing the sharpened end surfaces of said cutter tubes in a common plane.